US011522582B2

(12) United States Patent
Dehghan et al.

(10) Patent No.: US 11,522,582 B2
(45) Date of Patent: *Dec. 6, 2022

(54) WAP UPLINK OPTIMIZATION BY SELECTION OF MIMO ANTENNAS SPATIAL STATES

(71) Applicant: SEMICONDUCTOR COMPONENTS INDUSTRIES, LLC, Phoenix, AZ (US)

(72) Inventors: Hossein Dehghan, Diablo, CA (US); Sigurd Schelstraete, Menlo Park, CA (US)

(73) Assignee: QUANTENNA COMMUNICATIONS, INC., Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/060,895

(22) Filed: Oct. 1, 2020

(65) Prior Publication Data

US 2021/0021306 A1    Jan. 21, 2021

Related U.S. Application Data

(63) Continuation of application No. 16/673,569, filed on Nov. 4, 2019, now Pat. No. 10,797,765, which is a continuation of application No. 15/727,668, filed on Oct. 9, 2017, now Pat. No. 10,469,140.

(51) Int. Cl.
| | |
|---|---|
| H04B 7/04 | (2017.01) |
| H04B 7/0452 | (2017.01) |
| H04L 5/00 | (2006.01) |
| H04B 7/0408 | (2017.01) |

(52) U.S. Cl.
CPC ......... *H04B 7/0452* (2013.01); *H04B 7/0408* (2013.01); *H04L 5/0007* (2013.01)

(58) Field of Classification Search
CPC .......... H01Q 21/061; H01Q 1/38; H04B 7/04; H04B 7/0617
See application file for complete search history.

(56) References Cited

U.S. PATENT DOCUMENTS

| | | | |
|---|---|---|---|
| 8,064,835 | B2 | 11/2011 | Rezvani et al. |
| 10,009,784 | B1 * | 6/2018 | Evircan ................. H04L 41/142 |
| 10,567,134 | B1 | 2/2020 | Schelstraete |

(Continued)

OTHER PUBLICATIONS

T-W Ban et al., "A Practical Antenna Selection Technique in Multiuser Massive MIMO Networks," IEICE Trans. Commun. vol. E96-B, No. 11, Nov. 2013, pp. 2901-2905.

(Continued)

*Primary Examiner* — Sam Bhattacharya
(74) *Attorney, Agent, or Firm* — Maschoff Brennan

(57) ABSTRACT

A method to operate a wireless access point (WAP) that includes identifying multiple stations from uplink statistics of a plurality of uplinks and determining an optimal spatial state of an antenna array for reception of the plurality of uplinks. Channel state information (CSI) is evaluated for each antenna in the antenna array. Determining the optimal spatial state of the antenna array includes using the CSI for each antenna to extrapolate the optimal spatial state of the antenna array for the plurality of uplinks. The method further includes changing a spatial state of the antenna array to the optimal spatial state.

20 Claims, 5 Drawing Sheets

(56) References Cited

U.S. PATENT DOCUMENTS

2018/0152325 A1 5/2018 Frank et al.
2018/0205442 A1 7/2018 Oteri et al.

OTHER PUBLICATIONS

T-H Tai et al., "A Low Complexity Antenna Selection Algorithm for Energy Efficiency in MASsive MIMO Systems," DSDIS, 2015 IEEE, Dec. 11-13, 2015, 6 pages.
Gao et al., "Antenna Selection in Measured Massive MIMO Channels using Convex Optimization," IEEE Globecom Workshop, Atlanta, Georgia, US, 2013, 7 pages.
Lu et al., "An Overview of Massive MIMO Benefits and Challenges," IEEE Journal of Selected Topics in Signal Processing, vol. 8, No. 5, Oct. 2014, pp. 742-758.
Gao et al., "Massive MIMO in Real Propagation Environments: Do all Antennas Contribute Equally," IEEE Transactions on Communicatins Jan. 2015, 13 pages.
Gao et al., "Multi-Switch for Antenna Selection in Massive MIMO," IEEE Global Communications Confererence, 2015, 6 pages.

* cited by examiner

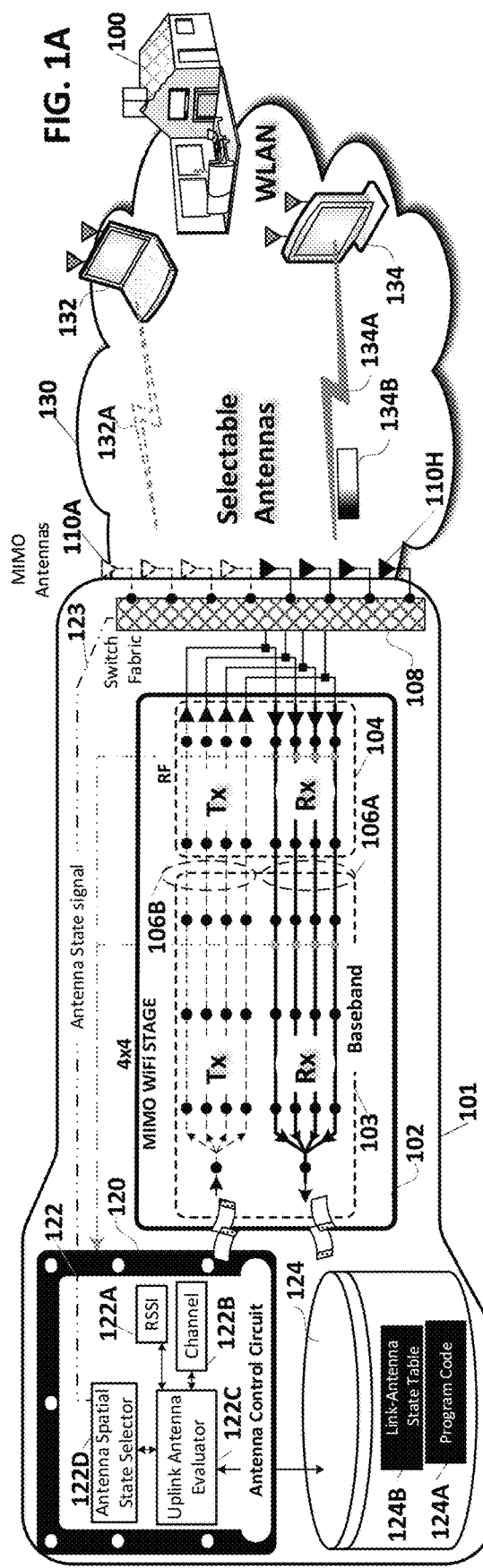
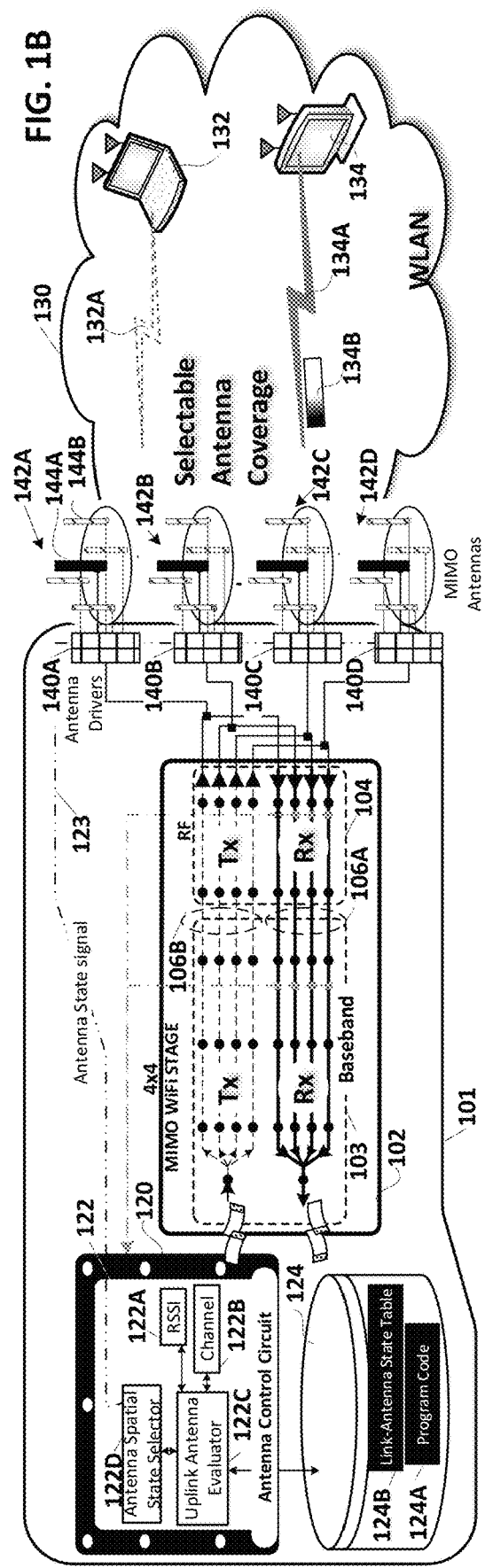
FIG. 1A
FIG. 1B
MIMO Antenna Arrays with Selectable Spatial States FIG. 4A    WAP with Selectable MIMO Antenna Array Spatial States

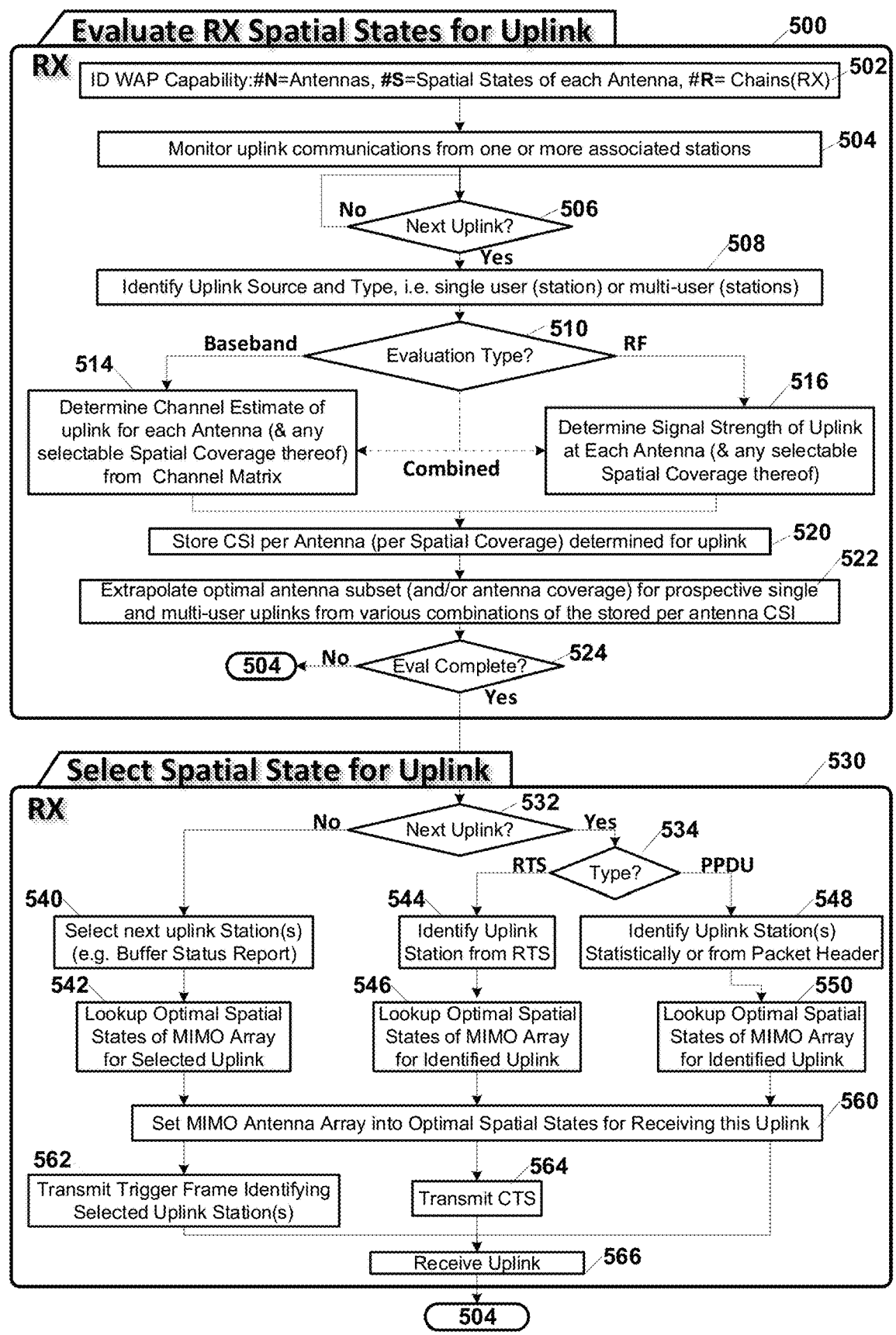
FIG. 5   Method for Optimizing MIMO Spatial States for each Uplink

WAP UPLINK OPTIMIZATION BY SELECTION OF MIMO ANTENNAS SPATIAL STATES

BACKGROUND OF THE INVENTION

1. Field of Invention

The field of the present invention relates in general to wireless local area networks including wireless access points (WAP) and wireless stations and specifically enhanced Multiple-input multiple-output (MIMO) capabilities thereof.

2. Description of the Related Art

Home and office networks, a.k.a. wireless local area networks (WLAN) are established using a device called a Wireless Access Point (WAP). The WAP may include a router. The WAP wirelessly couples all the devices of the home network, e.g. wireless stations such as: computers, printers, televisions, digital video (DVD) players, security cameras and smoke detectors to one another and to the Cable or Subscriber Line through which Internet, video, and television is delivered to the home. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad", "ax". Communications follow a hub and spoke model with a WAP at the hub and the spokes corresponding to the wireless links to each 'client' device.

After selection of a communication channel(s) for the associated home network, access to the shared communication channel(s) relies on a multiple access methodology identified as Collision Sense Multiple Access (CSMA). CSMA is a distributed random access methodology for sharing a single communication medium, by having a contending communication link back off and retry access a prospective collision on the wireless medium is detected, i.e. if the wireless medium is in use. Communications on the single communication medium are identified as "simplex" meaning, one communication stream from a single source node to one or more target nodes at one time, with all remaining nodes capable of "listening" to the subject transmission.

With the adoption in the IEEE 802.11n standard of multiple-input multiple-output (MIMO) communications the communications throughput capacity on the existing spectrum was greatly enhanced. MIMO multiplies the capacity of a wireless communication link using multipath propagation between multiple transmit and receive antennas, a.k.a. the MIMO antenna arrays, on the WAP and the station on either end of a communication link.

Starting with the IEEE 802.11ac standard and specifically 'Wave 2' thereof, discrete communications to more than one target node at the same time may take place using what is called Multi-User (MU) MIMO capability of the WAP. MU capabilities were added to the standard to enable the WAP to transmit downlink communications to multiple stations concurrently, thereby increasing the time available for discrete MIMO video links to wireless HDTVs, computers tablets and other high throughput wireless devices. The IEEE 802.11ax standard expanded MU MIMO capabilities to include concurrent uplinks from two or more stations to the WAP.

What is needed are methods for further improvements in MIMO throughput capacity of each communication link between the WAP and its associated stations.

SUMMARY OF THE INVENTION

A method to operate a wireless access point (WAP) that includes identifying multiple stations from uplink statistics of a plurality of uplinks and determining an optimal spatial state of an antenna array for reception of the plurality of uplinks. Channel state information (CSI) is evaluated for each antenna in the antenna array. Determining the optimal spatial state of the antenna array includes using the CSI for each antenna to extrapolate the optimal spatial state of the antenna array for the plurality of uplinks. The method further includes changing a spatial state of the antenna array to the optimal spatial state.

The invention may be implemented in hardware, firmware or software.

Associated methods and circuits are also claimed.

BRIEF DESCRIPTION OF THE DRAWINGS

These and other features and advantages of the present invention will become more apparent to those skilled in the art from the following detailed description in conjunction with the appended drawings in which:

FIGS. 1A-B are system views a wireless local area network (WLAN) including alternate embodiments of a wireless access point (WAP) which selects the spatial states of its multiple-input multiple-output (MIMO) antenna array to optimize each uplink;

FIGS. 4A-B are overall and detailed circuit diagrams of the WAP with MIMO antenna array and an antenna control circuit for setting the spatial states of the MIMO antenna array to match the optimum spatial states for receiving each uplink, in accordance with an embodiment of the invention; and FIG. 5 is a process flow diagram of processes associated with optimizing the WAP's MIMO antenna array spatial states for reception of each uplink.

DETAILED DESCRIPTION OF THE EMBODIMENTS

Figure 2A:
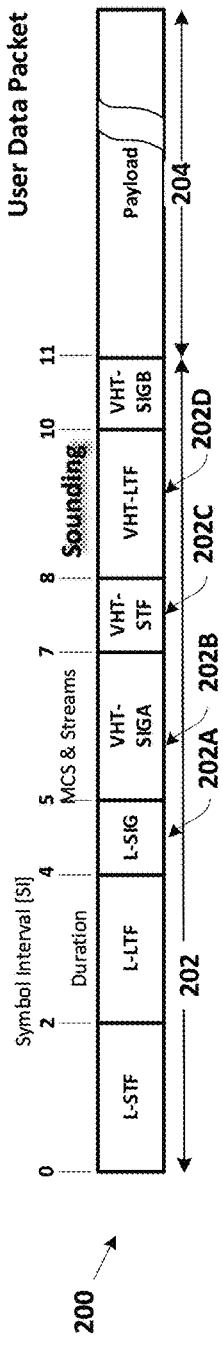
FIGS. 2A-C are respectively a packet diagram of a representative wireless user data packet, and data structures exhibiting representative types of channel state information (CSI) used for determining which spatial states of the MIMO array optimize reception of each uplink.

FIGS. 1A-B are system views a wireless local area network (WLAN) including alternate embodiments of a wireless access point (WAP) which selects the spatial states of its multiple-input multiple-output (MIMO) antenna array to optimize each uplink.

FIG. 1A is a system view of a residential WLAN 130 in a home 100. The WLAN includes a wireless access point (WAP) 101 and associated stations 132-134. The WAP has a wireless stage 102, with baseband and radio frequency (RF) portions 103-104 respectively. The WAP is shown as a 4×4 WAP with the capacity to transmit and receive up to 4 communications streams per link. In this embodiment of the invention the MIMO antenna array has selectable spatial states resulting from an excess of physical antennas over receive chains or transmit chains. The excess of WAP antennas vs. transmit and receive chains, e.g. 8 antennas 110A-H and 4 receive chains and transmit chains 106A-B allows the WAP to select the optimal subset of any 4 of the 8 antennas for each uplink between the WAP and its associated station(s) 132-134. Each subset has a different spatial state, e.g. RF footprint, based on the position of the antennas relative to one another. The antennas may be omnidirectional (isotropic) or directional (anisotropic). The selective coupling of physical antennas to transmit and receive chains is accomplished via the switch fabric 108 in response to an antenna state signal 123 from the antenna control circuit 122. The switch fabric may range in complexity from a simple multiplexer, e.g. 1×2, or 1×4, between each chain and corresponding ones of the antennas, to a complex switch fabric switchably coupling any chain to any of the antennas. In an embodiment of the invention the evaluation of which subset of 4 of the 8 antennas to couple to the receive chains for optimizing reception of a given uplink from one or more of the associated stations is made by an antenna control circuit 122, which in an embodiment of the invention may be instantiated by a processor circuit 120 executing program code 124A stored in non-volatile memory 124. The WAP is shown receiving uplinks 132A and 134A from stations 132-134 respectively. FIG. 1A captures the moment in time spanning uplink 134A from station 134. That uplink includes one or more packet(s) a.k.a. frame(s) 134B transmitted by station 134 to the WAP. As each successive uplink is received from the corresponding one(s) of the associated stations, either or both the Received Signal Strength Indicator (RSSI) or channel condition is determined for each antenna by at least one of the RSSI determination circuit 122A or the channel determination circuit 1228. Next the uplink antenna evaluator circuit 122C evaluates the RSSI and or channel condition information on each antenna, and extrapolates therefrom the optimal subset of antenna to receive the subject uplink. Optimal antenna subsets determined in this manner will differ for each single user (SU) MIMO uplink from one of the associated stations. Further evaluation by the uplink antenna evaluator circuit 122C of the RSSI or channel condition of two or more station's RSSI and or channel condition either singly or jointly can be used to determine the optimal subset of antenna for receiving either a multi-user (MU) MIMO uplink or an Orthogonal Frequency Division Multiple Access (OFDMA) uplink from two or more stations concurrently. The uplink antenna evaluator circuit 122C stores this accumulated information in the form of uplink-to-antenna spatial state table 124B which correlates each uplink and uplink type, with a corresponding distinct optimal subset of antenna for receiving said uplink. The uplink antenna selector circuit 122D selects the spatial states for the MIMO antenna array, e.g. the optimal subset of antenna, for receiving each uplink and signals the switch fabric via the antenna state signal with that information. In response the switch fabric switchably couples the four receive chains 106A to the optimum subset of four of the eight antennas 110A-H for receiving the subject uplink. The uplink antenna control circuit controls the switch fabric's timely switchable coupling of antennas to receive chains, via its switch fabric signal 123.

FIG. 1B is a system view of the residential WLAN 130 with an alternate embodiment of the MIMO antenna array 142A-D. In this embodiment of the invention the MIMO antenna array has selectable spatial states resulting from antennas with individually selectable spatial coverage. The number of antennas matches the number of receive chains, but spatial state selection results from the selectable spatial coverage, e.g. RF footprint, afforded by each antenna. This provides the opportunity for selecting the spatial states for the MIMO antenna array to optimize each uplink. The antennas in this embodiment of the invention are each electronically steerable antenna (ESA). Various types of antenna including: patch antennas, phased arrays, Yagi, etc. are suitable for this purpose. The antennas shown in this embodiment of the invention each include: a driven element and one or more parasitic elements. Driven/active and parasitic/passive elements 144A-B respectively for antenna 142A are shown. Each of the antennas 142A-D has a distinct anisotropic RF signal strength footprint. The selectable spatial states, e.g. RF footprints, of each antenna 142A-D are achieved by the one or more parasitic elements the impedance of which is controlled by means of a corresponding antenna driver 140A-D. Each antenna driver sets the impedance of each of the antenna's parasitic elements to spatially shape the antennas RF signal strength footprint in response to the corresponding antenna state signal 123 from the antenna control circuit 122. The evaluation of which spatial state for each antenna is optimum for receiving a given uplink from one or more of the associated stations is made by an antenna control circuit 122. As each successive uplink is received from the corresponding one(s) of the associated stations, either or both the Received Signal Strength Indicator (RSSI) or channel condition is determined for each antenna and for each selectable spatial state thereof by at least one of the RSSI determination circuit 122A or the channel determination circuit 1228. Next the uplink antenna evaluator circuit 122C evaluates the RSSI and or channel condition information on each antenna, and extrapolates therefrom the optimal spatial state for each antenna in the array to receive the subject uplink. The optimal spatial state for each antenna determined in this manner will differ for each single user (SU) uplink from one of the associated stations. Further evaluation by the uplink antenna evaluator circuit 122C of the RSSI or channel condition of two or more station's RSSI and or channel condition either singly or jointly can be used to determine the optimal subset of antenna for receiving either a multi-user (MU) MIMO uplink or an Orthogonal Frequency Division Multiple Access (OFDMA) uplink from two or more stations concurrently. The uplink antenna evaluator circuit 122C stores this accumulated information in the form of uplink-to-antenna spatial state table 124B which correlates each uplink and uplink type, with a corresponding distinct optimal spatial state of each antenna in the array for receiving said uplink. The uplink antenna selector circuit 122D selects the spatial states for the MIMO antenna array, e.g. the optimal spatial state of each antenna, for receiving each uplink and signals the corresponding antenna drivers 140A-D via the antenna state signal with that information.

In another embodiment of the invention the MIMO antenna array may incorporate both a greater number of antenna than receive or transmit chains as well as selectable spatial coverage in one or more of the antennas without departing from the scope of the claimed invention.

Figure 2B:
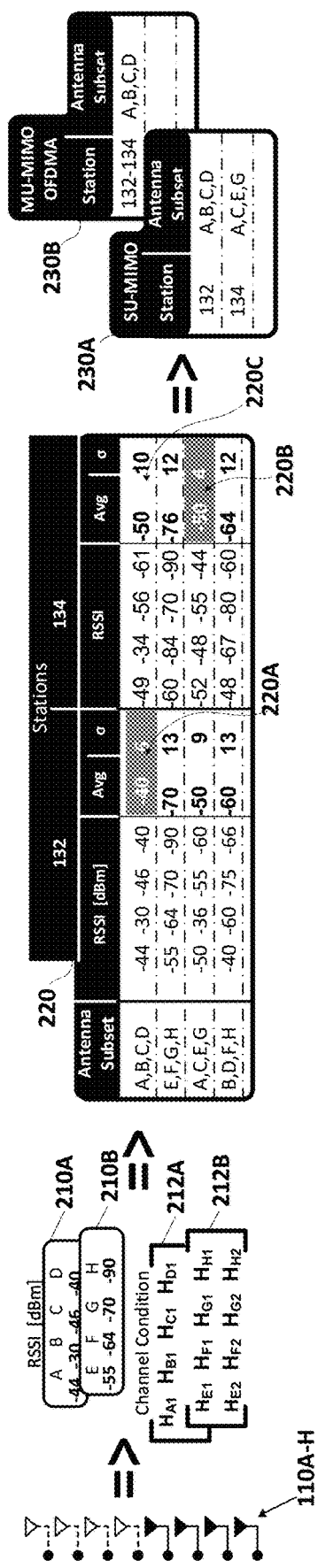
Figure 2C:
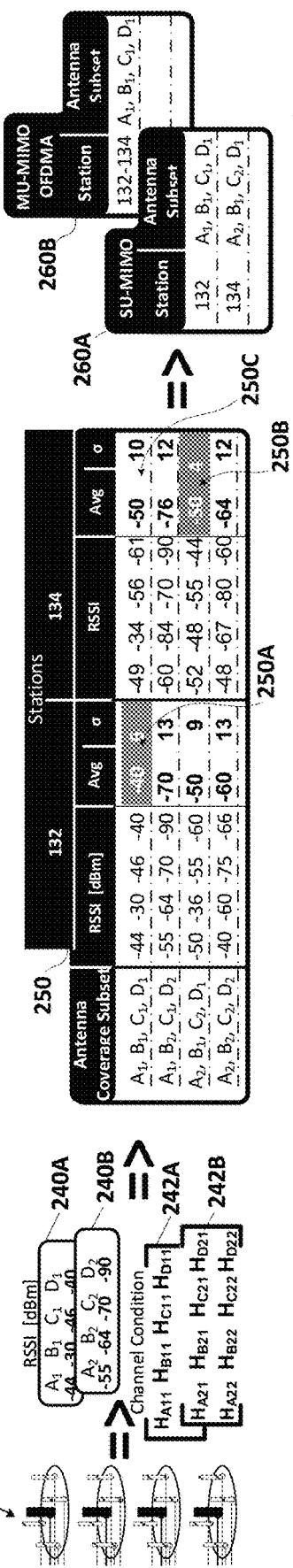

FIGS. 2A-C are respectively a packet diagram of a representative wireless user data packet, and data structures exhibiting representative types of channel state information (CSI) used for determining which spatial states of the MIMO array optimize reception of each uplink.

FIG. 2A is a packet diagram of a representative wireless user data packet/frame 200, a.k.a. in the IEEE 802.11 parlance as a Physical Layer Convergence Protocol (PLOP) PLOP Protocol Data Unit (PPDU). All WLAN packet headers include various preamble fields with known sequences which allow the receiving station to synchronize reception with packet boundaries and to determine the received channel. User data packet 200 is shown divided into fields with the representative symbol intervals (SI) required to transmit each field. The header 202 includes a legacy portion containing the L-STF, L-LTF and L-SIG fields and a very high throughput portion containing the VHT-SIG-A, VHT-STF, VHT-LTF and VHT-SIG-B fields. The legacy (L), long (LTF) and short (STF) training and signal (SIG) 202C fields are compatible with stations supporting only the IEEE 802.11n or earlier standards. The remaining signal and training fields are intended only for very high throughput, e.g. IEEE 802.11ac/ax compliant devices. The VHT-SIG-A field 202B contains information on the modulation and coding scheme (MCS) and number of streams of the sounding. The VHT-STF field 202C is used for automatic gain control (AGC). The VHT-LTF field 202D, a.k.a. channel estimation or sounding field, contains a long training sequence used for MIMO channel estimation by the receiver. The payload portion 204 of the packet contains the uplink or downlink user data.

FIG. 2B shows data structures exhibiting representative types of channel state information (CSI) derived from uplink WLAN communications and evaluated by the uplink antenna evaluator circuit 122C on a per antenna basis for the antenna array 110A-H shown in FIG. 1A. In an embodiment of the invention the evaluation of the CSI of each uplink, e.g. uplink 134A, initially involves the determination of the received signal strength indicator (RSSI) on each of antennas 110A-D and 110E-H as shown in tables 210A-B respectively, for uplink 134A. In another embodiment of the invention the CSI on each antenna on each uplink may be measured in a more detailed fashion by obtaining the channel measurement "H" on each of antennas 110A-D and 110E-H as shown in matrices 212A-B respectively for uplink 134A. In other embodiments of the invention CSI may also include: signal-to-noise ratio (SNR) or channel rank. Either the RSSI or the channel measurement "H" may be made by coupling the four receive chains to alternate subsets 110A-D and 110E-H of the antennas during uplink reception of one or more packets from the uplink station. Next, the CSI from the alternate subsets is used to extrapolate all possible chain-to-antenna combinations, to determine which is optimal for a given uplink. The number of distinct antenna subsets/combinations C (N, R) of the MIMO Array that can be coupled to existing receive chains is calculated as: C (N, R)=N!/(R!×(N−R)!), where "N" is the number of Antennas and "R" is the number of receive chains. Table 220 shows a portion of such extrapolation for an SU-MIMO uplink from station 132 and for another SU-MIMO uplink from station 134. The per antenna RSSI determinations provided by Tables 210 for uplink 134A provide the source for extrapolating the performance of all the various discrete antenna subsets for receiving that link. A separate CSI determination (not shown) for uplink 132A is used for extrapolating the performance of the various antenna subsets for receiving that uplink. For either uplink 132A or 134A only four of the possible seventy distinct subsets of antennas which can be extrapolated from the two initial subsets of antennas 110A-D and 110E-H for which CSI is measured are shown. Of the distinct subsets shown in table 220, the optimal subset for receiving uplink 132A is antennas 110A, 110B, 110C, 110D. As highlighted by reference arrow 220A, that antenna subset has the highest average RSSI, e.g. −40 dBm and the lowest standard deviation, e.g. sigma of 6 of all the distinct subsets shown. Of the distinct subsets shown in table 220, the optimal subset for receiving uplink 134A is antennas 110A, 110C, 110E, 110G. As highlighted by reference arrow 220B, that antenna subset has the highest average RSSI, e.g. −50 dBm and the lowest standard deviation, e.g. sigma of 4 of all the distinct subsets shown. Once the optimal subsets for receiving each SU-MIMO uplink are identified they are stored in a corresponding SU-MIMO uplink-to-antenna spatial state table 230A. The same extrapolated spatial state table 220 can also be used for identifying the optimal subset of antenna for a multi-user uplink, e.g. an OFDMA or MU-MIMO uplink from the pair of stations 132 and 134 for example. For purposes of that example the reception of a multi-user uplink from stations 132-134 on antenna subset 110A-D as shown in the first row of table 220 provides, as indicated by reference arrows 220A, 220C, the highest combined average RSSI, i.e. −45 dBm=(−40−50)/2, and lowest average sigma, i.e. 8=(6+10)/2, of all other combinations shown on the remaining three rows of that table. Once the optimal subsets for receiving each MU-MIMO uplink are identified they are stored in a corresponding MU-MIMO uplink-to-antenna spatial state table 230B.

FIG. 2C shows data structures exhibiting representative types of channel state information (CSI) derived from uplink WLAN communications and evaluated by the uplink antenna evaluator circuit 122C on a per antenna basis for the antenna array 142A-D shown in FIG. 1B. In an embodiment of the invention the evaluation of the CSI of each uplink, e.g. uplink 134A, involves the determination of the RSSI on each of antennas 142A-D in their individual selectable spatial states. In the example shown each antenna has two possible spatial states, e.g. selectable RF footprints represented by the subscripts "1" or "2", as shown in tables 240A-B respectively. In another embodiment of the invention the CSI on each antenna in either of the two representative spatial states "1" or "2" on each uplink may be measured in a more detailed fashion by obtaining the channel measurement "H" on each of antennas 142A-D in each of their two spatial states. These channel measurements are shown in matrices 242A-6 respectively for uplink 134A. In other embodiments of the invention CSI may also include: signal-to-noise ratio (SNR) or channel rank. Either the RSSI or the channel measurement "H" may be made during uplink reception of one or more packets from the uplink station. Next, the CSI from the initial determination is used to extrapolate all possible antenna spatial state combinations for all antennas in the array to determine which is optimal for a given uplink. Table 250 shows a portion of such extrapolation for an SU-MIMO uplink from station 132 and for another SU-MIMO uplink from station 134. The per antenna RSSI determinations provided by Tables 240A-6 for uplink 134A provide the source for extrapolating the performance of all the various combinations of discrete antenna spatial states for receiving that uplink. A separate CSI determination (not shown) for uplink 132A is used for extrapolating the performance of the various antenna subsets for receiving that uplink. For either uplink 132A or 134A only four out of the numerous sets of spatial states which can be extrapolated from the initial spatial state samples are shown. Of the distinct subsets of spatial states shown in table 250, the optimal subset for receiving uplink 132A is antennas $142A_1$, $142B_1$, $142C_1$, $142D_1$. As highlighted by reference arrow 250A, each of antennas 142A-D in spatial state "1" provides the highest average RSSI, e.g. −40 dBm and the lowest standard deviation, e.g. sigma of 6 of all the distinct subsets shown. Of the distinct subsets shown in table 250, the optimal subset of spatial states for all antennas for receiving uplink 134A is antennas $142A_2$, $142B_1$, $142C_2$, $142D_1$. As highlighted by reference arrow 250B, uplink reception of link 134A is optimized when each of antennas 142B and 142D is set to spatial state "1" and each of antennas 142A and 142C is in spatial state "2". That subset of spatial states of the antenna array has the highest average RSSI, e.g. −50 dBm and the lowest standard deviation, e.g. sigma of 4 of all the distinct subsets shown. Once the optimal subsets for receiving each SU-MIMO uplink are identified they are stored in a corresponding SU-MIMO uplink-to-antenna spatial state table 260A. The same extrapolated spatial state table 250 can also be used for identifying the optimal subset of antenna for a multi-user uplink, e.g. an OFDMA or MU-MIMO uplink from the pair of stations 132 and 134 for example. The reception of a multi-user uplink from stations 132-134 is optimized when antenna $142A_2$, $142B_1$, $142C_2$, $142D_1$ are in the spatial states represented by the even and odd suffixes "1" and "2". That mix of per antenna spatial states as shown in the first row of table 250 provides, as indicated by reference arrows 250A, 250C, the highest combined average RSSI, i.e. −45 dBm= (−40−50)/2, and lowest average sigma, i.e. 8=(6+10)/2, of all other combinations shown on the remaining three rows of that table. Once the optimal subsets for receiving each MU-MIMO uplink are identified they are stored in a corresponding MU-MIMO uplink-to-antenna spatial state table 260B.

Figure 3A:
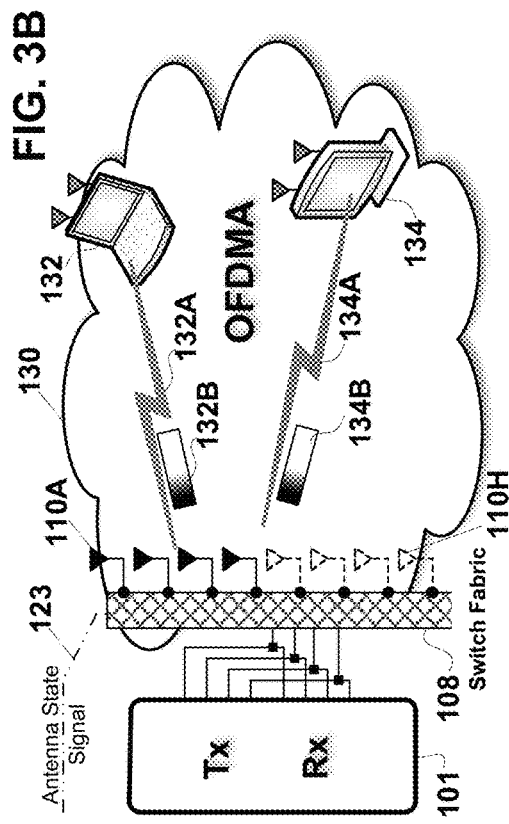
FIGS. 3A-C are respectively system views of the WLAN showing uplink communications thereon, and representative packet, a.k.a. frame, types which allow the spatial states of the MIMO antenna array to be optimized for receipt of each uplink.
Figure 3B:
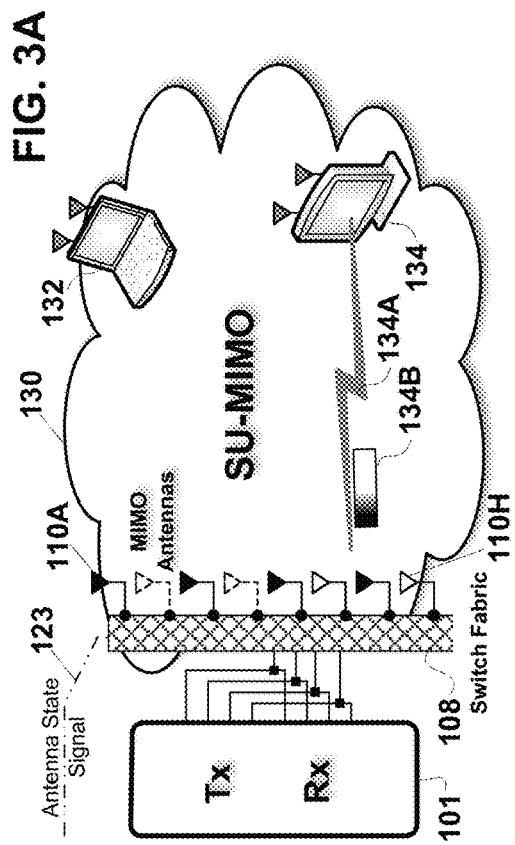
Figure 3C:
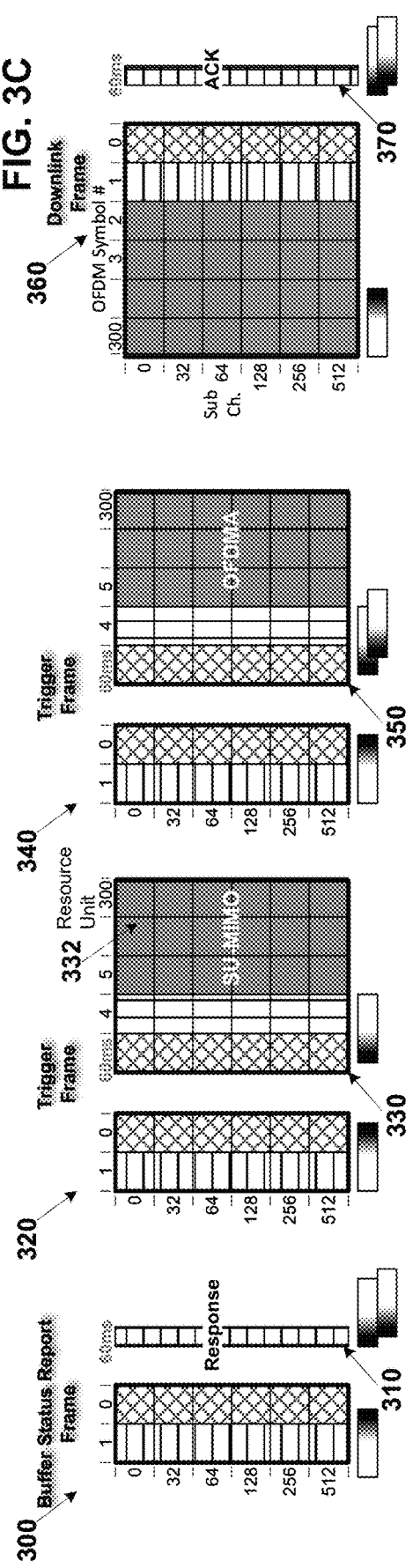

FIGS. 3A-C are respectively system views of the WLAN showing uplink communications thereon, and representative packet, a.k.a. frame, types which allow the spatial states of the MIMO antenna array to be optimized for receipt of each uplink.

FIG. 3A is a system view of the WLAN 130 showing a scheduled SU-MIMO uplink 134A communication packet 134B received by the WAP 101 from station 134. The MIMO antenna array in this embodiment corresponds to that shown in FIG. 1A, having more antennas than receive chains or transmit chains. The switch fabric 108 is responsive to the antenna state signal 123 to couple the optimal subset of antennas 110A, 110C, 110E, 110G for uplink 134A to the receive chains for receipt thereof. The spatial state for the antenna array for the subject single user uplink is set in advance of the reception of the uplink, i.e. proactively, via the trigger frame 340 shown in FIG. 3C.

FIG. 3B is a system view of the WLAN 130 showing a scheduled multi-user uplink from both stations 132 and 134. The scheduled uplink is an Orthogonal Frequency Division Multiple Access (OFDMA) uplink in which each uplink station is given a non-overlapping frequency range on which to transmit the uplink. Station 132 transmits its OFDMA uplink 132A packet 132B on it's allotted portion of the uplink channel(s) concurrently with station 134 which transmits its OFDMA uplink 134A packet 134B on it's remaining non-overlapping allotted portion of the uplink channel(s). The switch fabric 108 is responsive to the antenna state signal 123 from the antenna control circuit (see FIG. 1A) to couple the optimal subset of antennas 110A, 110B, 110C, 110D for that uplink to the receive chains for receipt thereof. The spatial state for the antenna array for the subject multi-user uplink is set in advance of the uplink, i.e. proactively, via the trigger frame 360 shown in FIG. 3C.

FIG. 3C shows representative packet, a.k.a. frame, types which provide proactive selection of antenna states for each uplink, in an embodiment of the invention. The selection of the spatial states of the array of antenna is characterized as proactive, because the WAP initiates the uplink, e.g. single user uplink or multi-user uplink, and is able to select the spatial states of the array in advance of the subject uplink. The WAP initiates the uplink with a series of frame/packet transmissions to the associated stations. Each packet/frame is defined in terms of building blocks of time and frequency 332 identified as "resource" units. The horizontal intervals of time are identified as symbol intervals, which in the IEEE 802.11ax protocol are 4 ms in duration. The vertical intervals of frequency are identified as tones or sub-channels of the orthogonal frequency division multiplexed (OFDM) communication channel(s). The WAP, in this embodiment of the invention, initiates uplinks by transmitting a buffer status report frame 300 requesting from each associated station the status of their uplink buffers, e.g. the amount of data they each have in their uplink buffer for transmission to the WAP. Each station provides its response to the WAP in individual response packets 310. The WAP then analyzes this data determines which station(s) require an uplink and the order and type of uplink they will each be allocated. In determining the type of uplink, e.g. single or multi-user that the station(s) will be assigned, the WAP utilizes information about each station obtained during its initial association with the WLAN in a capabilities exchange. In the example shown, the WAP has determined that both stations 132-134 have uplink data in their buffers, and schedules an SU-MIMO uplink from station 134 (See FIG. 3A) followed by an OFDMA uplink (See FIG. 3B) from stations 132-134. The WAP then sequentially announces its uplink selection to the stations in the form of trigger frames, e.g. trigger frame 320 which identifies which station or stations will make an uplink, the type of uplink, e.g. SU-MIMO, MU-MIMO, OFDMA, and the allotted frequency range, a.k.a. communication channels, assigned thereto. Where the WAP and station are IEEE 802.11ax compliant, the station will respond to the trigger frame within 60 ms by transmitting the proscribed uplink. Station 134 is shown transmitting such a response to the trigger frame 320 in the form of uplink 330. The WAP's antenna control circuit 122 (See FIG. 1A) switchably couples the optimal subset of the antennas in the MIMO array, i.e. antennas 110A, 110C, 110E, 110G to the receive chains in advance of the SU-MIMO uplink, thus optimizing the reception of the uplink from station 134. After receipt of the first uplink in the scheduled sequence the WAP then announces the next scheduled uplink with trigger frame 340 which identifies the two stations 132-134 that will make an uplink, the type of uplink, e.g. OFDMA, and the allotted frequency range, e.g. subchannels/tones with indices 0-127 to station 132 and subchannels/tones with indices 128-512 to station 134. In response to the trigger frame, the uplink stations 132-134 transmit the scheduled uplink in the form of a trigger frame responses 350 to the WAP. The WAP's antenna control circuit 122 switchably couples the optimal subset of antennas in the MIMO antenna array, i.e. antennas 110A, 110B, 110C, 110D to the receive chains in advance of the OFDMA uplink, thus optimizing the reception of the OFDMA uplinks. The WAP also transmits downlink frames with user data to the station(s). The downlink frame 360 transmitted by the WAP 101 is shown as an OFDMA downlink to both stations 132-134 concurrently. Each station(s) confirms receipt of the downlink via a corresponding "ACK" packet 370. The downlink antenna selection is also made using the optimal subset of antenna, with the switching of antennas to transmit chains made by the switch fabric 108. In another embodiment of the invention the WAP proactively schedules more than one uplink at a time using a trigger or other proscribed frame structure, with the WAP setting the optimal spatial states for the MIMO antenna array before each of the scheduled uplinks.

In another embodiment of the invention the WAP reactively selects the spatial states of the array in advance of the subject uplink, in response to a request to send (RTS) packet from one of the associated stations. The WAP identifies the station requesting authorization to transmit an uplink from the "source" field in the header of its RTS packet. The WAP performs a lookup in its SU-MIMO uplink-to-antenna spatial state table, e.g. 230A and or 260A (See FIGS. 2B-C) and identifies the optimal spatial states for receipt of the uplink. The WAP then sets the antennas of the MIMO array into the identified optimal spatial states and then transmits the clear to transmits a (CTS) packet/frame to the station to initiate transmission by the station of the uplink.

In still another embodiment of the invention the WAP reactively selects the spatial states of the array during each uplink, based on a statistical analysis of uplink traffic. The statistical analysis may for example be based on the percentage of uplink traffic, with the optimal spatial states of the antenna array being selected to optimize the predominant uplink, e.g. the associated wireless HDTV or wireless set top box. Alternately, the statistical analysis may rely on historical information as to current uplink stations, and indirect uplink identification information such as the direction and signal strength of each uplink to reactively select the optimal spatial states of the MIMO antenna array on receipt of the preamble portion of the uplink packet header and before the VHT-LTF or payload of the uplink packet. In still another embodiment of the invention the WAP reactively selects the spatial states of the array during each uplink based on a station identifier in the preamble or packet header.

Figure 4B:
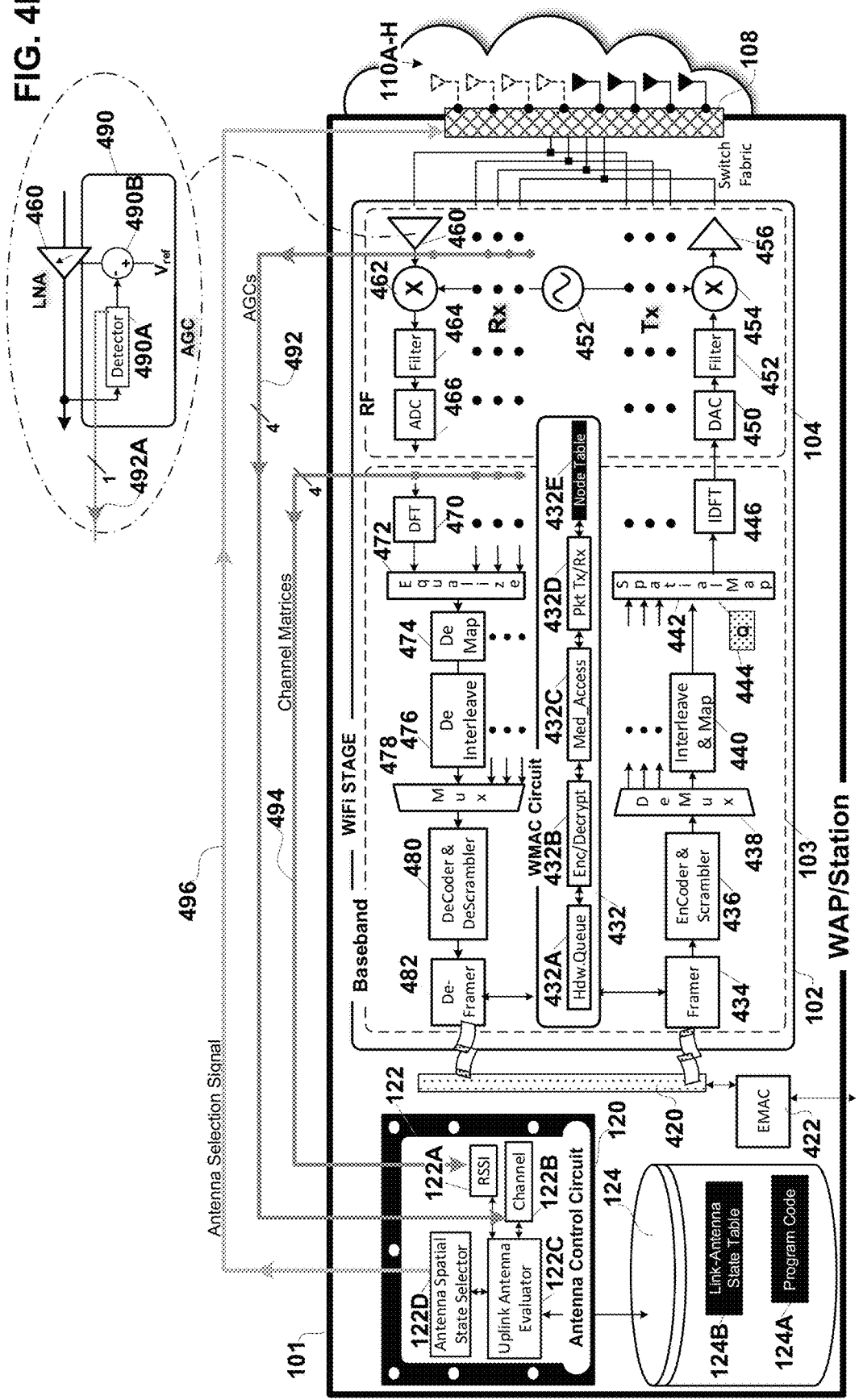

FIGS. 4A-B are overall and detailed circuit diagrams of the WAP with MIMO antenna array and an antenna control circuit for setting the spatial states of the MIMO antenna array to match the optimum spatial states for receiving each uplink, in accordance with an embodiment of the invention.

FIG. 4A is a detailed hardware block diagram of the WAP 101. The WAP supports wireless communications on a wireless local area network (WLAN) which network provides associated stations, access to the Internet.

The WAP in this embodiment of the invention is identified as a 4×4 multiple-input multiple-output (MIMO) WAP supporting as many as 4 discrete communication streams over its MIMO antenna array. The MIMO antenna array has selectable spatial states. The selectable spatial states may arise from either or both an excess of selectable antennas over the number of receive and transmit chains or from selectable spatial coverage on the part of one or more of the antenna in the array. In this embodiment of the invention the WAP has selectable antennas 110A-H greater in number, e.g. 8, than the number, e.g. 4, of receive or transmit chains. The WAP couples to the Internet via an Ethernet medium access control (EMAC) interface 422 over a cable, fiber, or digital subscriber line (DSL) backbone connection (not shown). A packet bus 420 couples the EMAC to the WiFi stage 102, including the MIMO WiFi baseband 103, and the analog front end (AFE) and Radio Frequency (RF) stages 104 thereof.

In the baseband portion 103 wireless communications transmitted to or received from each user/client/station are processed. The baseband portion is dynamically configurable to support single or multi-user transmissions communications with the associated stations. The AFE and RF portion 104 handles the upconversion on each of transmit paths of wireless transmissions initiated in the baseband. The RF portion also handles the downconversion of the signals received on the receive paths and passes them for further processing to the baseband.

TRANSMISSION: The transmit path/chain includes the following discrete and shared components. The WiFi medium access control (WMAC) component 432 includes: hardware queues 4322A for each downlink and uplink communication stream; encryption and decryption circuits 432B for encrypting and decrypting the downlink and uplink communication streams; medium access circuit 432C for making the clear channel assessment (CCA), and making exponential random backoff and re-transmission decisions; and a packet processor circuit 432D for packet processing of the communication streams. The WMAC component has a node table 432E which lists each node/station on the WLAN, the station's capabilities, the corresponding encryption key, and the priority associated with its communication traffic.

Each sounding or data packet for wireless transmission on the transmit path components to one or more stations is framed in the framer 434. Next each stream is encoded and scrambled in the encoder and scrambler 436 followed by demultiplexing into up to four streams in demultiplexer 438. Each stream is then subject to interleaving and mapping in a corresponding one of the interleaver mappers 440. Next downlink transmissions are spatially mapped in the spatial mapper 442 with a beamforming matrix 444. The spatially mapped streams from the spatial mapper are input to Inverse Discrete Fourier Transform (IDFT) components 446 for conversion from the frequency to the time domain and subsequent transmission in the AFE and RF stage 104.

Each IDFT is coupled to a corresponding one of the transmit path/chain components in the AFE/RF stage 104. Specifically, each IDFT couples to an associated one of the digital-to-analog converters (DAC) 450 for converting the digital transmission to analog. Next each transmit chain is filtered in filters 452, e.g. bandpass filters, for controlling the bandwidth of the transmissions. After filtration the transmissions are upconverted in upconverters 454 to the center frequency of the selected channel. Each upconverter is coupled to a voltage controlled oscillator (VCO) 452 for upconverting the transmission to the appropriate center frequency of the selected channel(s). Next, one or more stages of amplification is provided on each chain by power amplifiers 456. For each downlink, the antenna control circuit switchably couples, via the switch fabric 108, the four transmit chains to the optimal subset of four of the eight antennas 110A-H for the given downlink.

RECEPTION: The receive path/chain includes the following discrete and shared components. Received communications on the transceiver's array of MIMO antenna are subject to RF processing including downconversion in the AFE-RF stage 104. The four receive chains/paths are coupled by the switch fabric 108 to the optimal subset of four out of the eight antennas 110A-H for receiving each uplink. The switch fabric operates under control of the antenna control circuit 122 via input of the antenna selection signal 496 therefrom. The received uplink from each antenna is amplified in a corresponding one of the low noise amplifiers 460. Each amplifier 460 is coupled to a corresponding analog gain control shown in detail in FIG. 4B.

FIG. 4B shows a representative AGC 490 for one of the receive chains. Each AGC includes a detector 490A which monitors the average or peak output signal level of LNA and adjusts the gain of the corresponding LNA 460 via feedback to the variable voltage source 490B coupled to supply voltage input of the LNA. In an embodiment of the invention the antenna control circuit 122 evaluates the amount of gain 492A applied by the detector 490A of each AGC on each receive chain individually for each uplink. From this information for each of the four receive chains, e.g. AGC gain signals 492, the antenna control circuit determines the optimal subset of antennas for receipt of subsequent uplinks from the same station, e.g. the subset of antennas with the greatest average received signal strength and lowest standard deviation for a given uplink.

FIG. 4A also shows the following additional discrete and shared components on each receive chain. Downconverters 462 are coupled to the VCO 452 for downconverting the received signals on each chain. Each chain's received signal is then filtered in filters 464. Next the downconverted analog received signal on each chain is digitized in a corresponding one of the analog-to-digital converters (ADC) 466. In an embodiment of the invention digital signals on each chain are passed 494 to the antenna control circuit 122 for determination of the channel matrices for each antenna. Next on the receive paths, the digital output from each ADC is passed to a corresponding one of the discrete Fourier transform (DFT) components 470 in the baseband portion 103 of the WiFi stage for conversion from the time to the frequency domain.

Receive processing in the baseband stage includes the following shared and discrete components: an equalizer 472 to mitigate channel impairments which is coupled to the output of the DFTs 470. The received streams at the output of the equalizer are subject to demapping and deinterleaving in a corresponding one of the demappers 474 and deinterleavers 476. Next the received stream(s) are multiplexed in multiplexer 478 and decoded and descrambled in the decoder and descrambler component 480, followed by deframing in the deframer 482. The received communication is then passed to the WMAC component 432 where it is decrypted with the decryption circuit 432B and placed in the appropriate upstream hardware queue 432D for upload to the Internet.

The WAP also includes the Antenna Control circuit 122 coupled to the plurality of components that form the receive and transmit chains/paths. The antenna control circuit controls the spatial states of the MIMO antenna array for optimizing receipt of each uplink. The selectable spatial states of the MIMO antenna array arise from either or both an excess in the number of antenna versus the number of receive chains, or spatial coverage selectability for each of the antennas. The antenna control circuit evaluates each uplink on each antenna and where available, for each spatial state of a given antenna, and extrapolates from this information the optimal spatial states of the MIMO antenna array for each uplink whether single or multi user. The antenna control circuit stores the information for use in optimizing subsequent uplinks. The antenna control circuit then: identifies each subsequent uplink, looks up the previously determined optimum spatial states of the MIMO antenna array for receiving the uplink, and then sets the MIMO antenna array into those optimum spatial receipts prior to or during receipt of the uplink.

As discussed above, each successive uplink received from the corresponding one(s) of the associated stations is evaluated on each antenna and for any selectable spatial coverage thereof, as to either or both the Received Signal Strength Indicator (RSSI) or channel condition. This evaluation is performed by at least one of the RSSI determination circuit 122A or the channel determination circuit 122B. Next the uplink antenna evaluator circuit 122C evaluates the RSSI and or channel condition information on each antenna, and extrapolates therefrom the optimal subset of antenna and or spatial coverage of each antenna, to receive the subject uplink. Optimal antenna subsets determined in this manner will differ for each single user (SU) MIMO uplink from one of the associated stations. Further evaluation by the uplink antenna evaluator circuit 122C of the RSSI or channel condition of two or more station's RSSI and or channel condition either singly or jointly can be used to determine the optimal subset of antenna for receiving either a multi-user (MU) MIMO uplink or an Orthogonal Frequency Division Multiple Access (OFDMA) uplink from two or more stations concurrently. The uplink antenna evaluator circuit 122C stores this accumulated information in the form of uplink-to-antenna spatial state table 1248 which correlates each uplink and uplink type, with a corresponding distinct optimal subset of antenna for receiving said uplink. The uplink antenna selector circuit 122D then identifies each uplink and selects the spatial states for the MIMO antenna array, e.g. the optimal subset of antenna or spatial coverage of individual antenna, for receiving the identified uplink and signals via the antenna selection signal 496 the switch fabric 108 and or antenna drivers 140A-D with that information. In response the individual antennas in the MIMO array are set to the optimum spatial state for receiving the identified uplink.

FIG. 5 is a process flow diagram of processes associated with optimizing the WAP's MIMO antenna array spatial states for reception of each uplink. Processing begins with the block 500 of processes for evaluating the spatial states of the MIMO antenna array for each uplink from a given station or stations and determining which spatial states of the array should be selected when receiving subsequent uplinks from the same station or stations. In the next block 530 of processes, the MIMO antenna array is set to the optimal spatial states for receiving each subsequent uplink.

Uplink evaluation in block 500 begins with the identification of the WAP capabilities, including the number #N of antenna in the MIMO array, the number #S of selectable spatial coverages for each antenna, and the number #R of receive chains. Next in process 504 the uplink communications from each of the associated stations are monitored on each individual antenna in the MIMO array, and for each individual selectable spatial coverage, if any, of said antenna. In decision process 506 a determination is made as to when each uplink is being processed. Next control passes to process 508 in which the uplink is identified as to each station involved in the uplink as well as the type of uplink, i.e. single or multi user. Control is then passed to decision process 510 in which a determination as to how the CSI information on the uplink, for each antenna and any selectable spatial coverages thereof, is to be determined. If the determination is to be made using CSI information from the baseband stage then control is passed to process 514. In process 514 the signal strength of the uplink on each antenna and or any selectable spatial coverages of each antenna is made using the channel estimate "H" obtained from each receive chain. The evaluation across all antenna and or any selectable spatial coverages thereof, may require several switch fabric states and or antenna driver states and thus may span more than one uplink packet. Control is then passed to process 520. Alternately, if the evaluation is to be made using CSI from the RF stage then control is passed to process 516. In process 516 the signal strength of the uplink on each antenna and or any selectable spatial coverages of each antenna is made using the AGC on each receive chain. The evaluation across all antenna and or any selectable spatial coverages thereof, may require several switch fabric states or antenna driver states and thus may span more than one uplink packet. Control is then passed to process 520. In another embodiment of the invention the evaluation involves combined AGC and CSI information after which control is also passed to process 520. In process 520 the CSI determined for the given uplink for each antenna and or any selectable spatial coverages thereof is stored in the uplink-to-antenna spatial state tables 124B as discussed above in connection with FIGS. 1A-B and FIGS. 2B-C. Control is then passed to process 522. In process 522 the optimal antenna subset and or antenna spatial coverage for subsequent prospective single and multi user uplinks is extrapolated from the CSI determined in either of processes 514-516. Next, if the evaluation of the uplinks is not yet complete then in decision process 524 such negative determination results in the return of control to process 504. Alternately, if a determination is made in decision process 524 that uplink evaluation is completed then control passes to the next block 530 of processes.

In the next block 530 of processes, the MIMO antenna array is set to the optimal spatial states for receiving each subsequent uplink using the information gleaned in the evaluation block 500 of processes. In decision process 532 a determination is made as to whether a next uplink is detected. If it is not, e.g. if the channel is available, then control passes to process 540.

In process 540 the WAP selects the next station or stations eligible for uplinking to the WAP. This selection can be based on a prior or current buffer status report response as discussed above in FIG. 3C. The WAP then in process 542 looks up the optimal spatial states of the MIMO array for receiving the selected uplink. Then in process 560 the WAP sets its MIMO antenna array into the optimal spatial states for receiving the uplink, and then schedules the uplink, e.g. proactively triggers the uplink. In process 562 in accordance with an embodiment of the invention the WAP transmits a trigger frame which identifies the selected uplink station(s) and the type of uplink, e.g. SU-MIMO, MU-MIMO, OFDMA. Then in process 566 the WAP receives the uplink with the MIMO antenna array preset to the optimal spatial states. Control then returns to process 504.

Alternately, if in decision process 532 a determination is made that an uplink or uplink precursor, e.g. a request to send (RTS), is being received then control passes to decision process 534. In decision process 534 a determination as to the type of the detected uplink is made. If for example a request to send (RTS) is received then the station making the request is identified in process 544. The WAP then in process 546 looks up the optimal spatial states of the MIMO array for receiving subsequent uplinks from the station that transmitted the RTS. Then in process 560 the WAP sets its MIMO antenna array into the optimal spatial states for receiving the uplink, and then schedules or triggers the uplink by transmitting a clear to send (CTS) response to the corresponding station. Then in process 566 the WAP receives the uplink with the MIMO antenna array preset to the optimal spatial states for receiving the uplink from the station that requested it. Control then returns to process 504.

Alternately, if in decision process 534 a determination is made that the uplink is a user data packet, e.g. an IEEE 802.11 PPDU, then control is passed to process 548. In process 548 the station(s) making the uplink are identified. The identification may be based on statistical analysis or on information in a field of the uplink packet header which identifies the station making the uplink, e.g. the source address. The statistical analysis may rely on historical information as to current uplink stations, and indirect uplink identification information such as the direction and signal strength of each uplink. After such identification control is passed to process 550. The WAP in process 550 looks up the optimal spatial states of the MIMO array for receiving the payload portion of the current uplink packet. Then in process 560 the WAP sets its MIMO antenna array into the optimal spatial states for receiving the remaining payload portion of the uplink packet. Then in process 566 the WAP receives the uplink payload with the MIMO antenna array set to the optimal spatial states. Control then returns to process 504.

The components and processes disclosed herein may be implemented singly or in combination by: hardware, circuits, firmware, software, or a processor executing computer program code; coupled to the wireless transceiver's transmit and receive path components, without departing from the scope of the Claimed Invention.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A method to operate an array of antennas the method comprising:
   identifying multiple stations from uplink statistics of a plurality of uplinks;
   determining, for the plurality of uplinks, an optimum spatial state of the array of antennas for receiving the plurality of uplinks; and
   changing a spatial state of the array of antennas for the plurality of uplinks to correspond to the optimum spatial state.

2. The method of claim 1, wherein optimum determined spatial state corresponds to joint performance of the uplinks.

3. The method of claim 2, wherein the joint performance includes one or more of throughput, error packet rate, or latency.

4. The method of claim 1, wherein optimum determined spatial state corresponds to a weighted performance of uplinks.

5. The method of claim 1, wherein optimum determined spatial state corresponds to robustness against a source of interference.

6. Method of claim 1, wherein optimum determined spatial state is derived from knowledge of channel state information (CSI) for the plurality of uplinks.

7. The method of claim 6, wherein the knowledge of CSI for SU measurements on a per uplink basis is used to determine optimum state of simultaneous multi-user (MU) uplinks for the plurality of uplinks.

8. The method of claim 6, wherein the knowledge of CSI for MU measurements for the plurality of uplinks is used to determine optimum state of individual SU uplink among the plurality of uplinks.

9. The method of claim 1, wherein the plurality of uplinks includes Orthogonal Frequency Division Multiple Access (OFDMA) and/or multi-user, multiple input, multiple output (MU-MIMO).

10. The method of claim 1, wherein identifying multiple stations from uplink statistics of a plurality of uplinks further comprising selecting, from the multiple stations, a subset of stations, wherein the optimum spatial state of the antenna array is determined for the subset of stations.

11. The method of claim 10, further comprising selecting, from the multiple stations, the subset of stations in view of the optimum spatial state of the antenna array.

12. The method of claim 1, wherein the optimum spatial state of the antenna array is determined without identifying all stations that are to transmit a next uplink.

13. The method of claim 1, wherein the optimum spatial state of the antenna array is determined based on a preamble portion of an uplink packet header of an associated uplink.

14. A method to operate an array of antennas, the method comprising:
    identifying multiple stations from uplink statistics of a plurality of uplinks;
    determining, for the plurality uplinks, an optimum spatial state of the array of antennas for receiving the plurality of uplinks; and
    changing a spatial state of the array of antennas for a subsequent downlink transmission to one or more stations of the multiple stations using the optimum spatial state.

15. The method of claim 14, wherein optimum determined spatial state is derived from knowledge of channel state information (CSI) for the plurality of uplinks.

16. The method of claim 15, wherein the knowledge of CSI for single-user (SU) measurements on a per uplink basis is used to determine optimum state of simultaneous multi-user (MU) uplinks for the plurality of uplinks.

17. The method of claim 16, wherein the knowledge of CSI for MU measurements for the plurality of uplinks is used to determine optimum state of individual SU uplink among the plurality of uplinks.

18. The method of claim 15, wherein the plurality of uplinks includes Orthogonal Frequency Division Multiple Access (OFDMA) and/or multi-user, multiple input, multiple output (MU-MIMO).

19. The method of claim 14, wherein identifying multiple stations from uplink statistics of a plurality of uplinks further comprising selecting, from the multiple stations, a subset of stations, wherein the optimum spatial state of the antenna array is determined for the subset of stations.

20. The method of claim 14, wherein the optimum spatial state of the antenna array is determined based on a preamble portion of an uplink packet header of an associated uplink.

* * * * *